United States Patent

[11] 3,563,187

| [72] | Inventor | Auram B. Zanft<br>New York, N.Y. |
|---|---|---|
| [21] | Appl. No. | 761,130 |
| [22] | Filed | Sept. 20, 1968 |
| [45] | Patented | Feb. 16, 1971 |
| [73] | Assignee | Hagan Industries, Incorporated<br>Corona, N.Y.<br>a corporation of New York |

[54] SEWAGE SLUDGE INCINERATOR
15 Claims, 2 Drawing Figs.

| [52] | U.S. Cl. | 110/7 |
|---|---|---|
| [51] | Int. Cl. | F23g 5/12 |
| [50] | Field of Search | 110/7, 8, 8<br>(C), 18, 18 (C) |

[56] References Cited
UNITED STATES PATENTS

| 2,592,491 | 4/1952 | Toepel | 110/8 |
| 3,396,681 | 8/1968 | Hubbard | 110/8 |

Primary Examiner—Kenneth W. Sprague
Attorney—Mason, Fenwick and Lawrence

ABSTRACT: A sewage sludge incinerator including a chamber having a flue, baffle means mounted in the chamber, means for injecting air into the chamber impinging upon the baffle means, means for heating the air injected into the chamber to produce a zone of heated turbulent air and means for injecting sewage sludge into the zone of heated turbulent air.

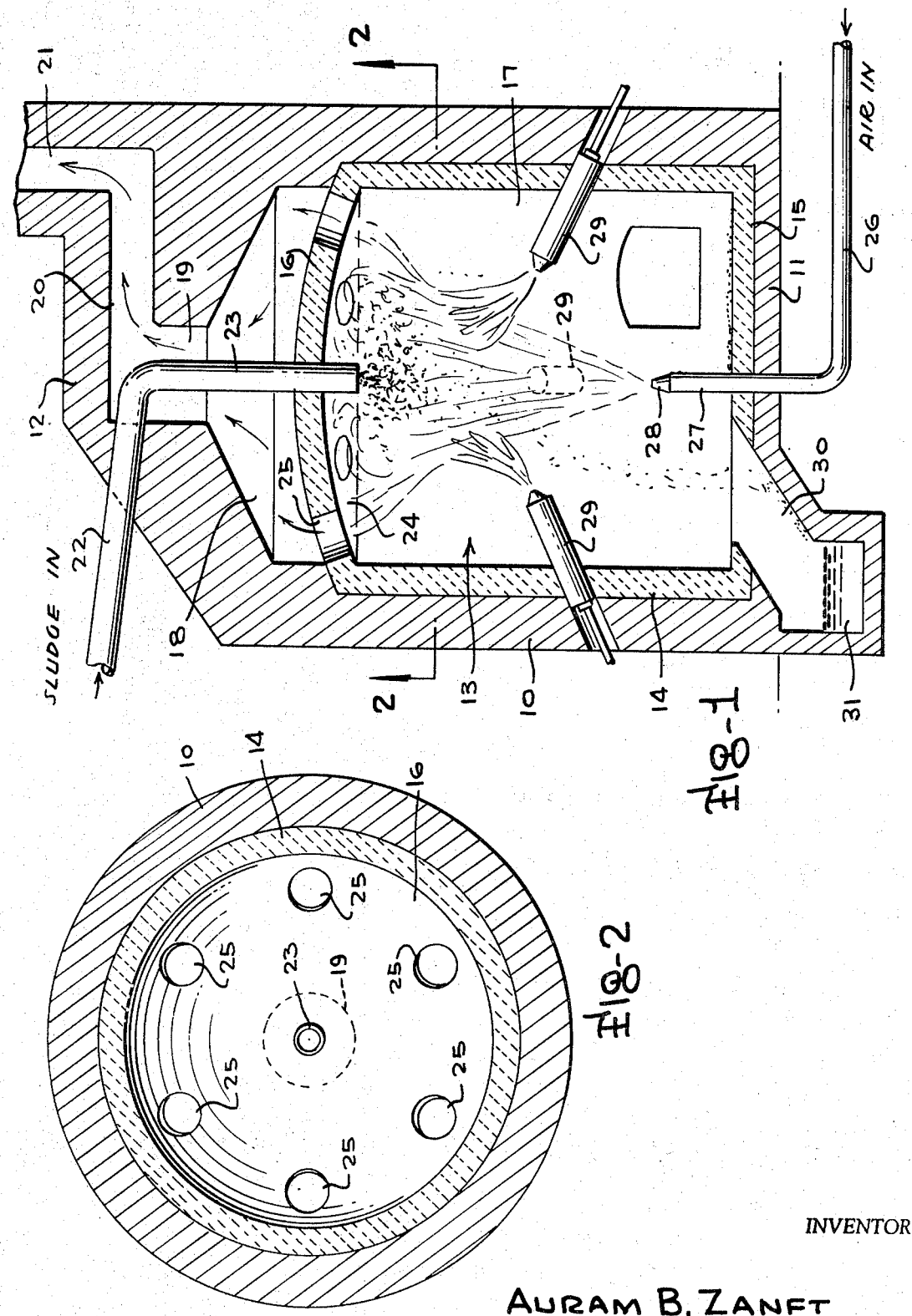

SEWAGE SLUDGE INCINERATOR

This invention relates to a novel apparatus and method for sewage disposal and more particularly to an improved apparatus and method for incinerating sewage sludge.

In most urban areas, the disposal of sewage has become a problem of critical proportions. In the past, sewage disposal has involved either discharging the sewage directly into streams, rivers, lakes or other large bodies of water, or discharging sewage into such bodies of water after certain chemical treatment requiring extensive plant facilities. The increased volume of sewage produced in growing residential, commercial and industrial communities has necessitated the development of a more effective means for reducing sewage sludge to a minimum volume and weight, readily adapted for disposal purposes, or industrial or commercial utilization.

Accordingly, the present invention relates to an apparatus for reducing sewage sludge to a minimum volume and weight, adapted for disposal purposes, or industrial or commercial utilization.

Another object of the present invention is to provide a novel method of reducing sewage sludge to a minimum volume and weight.

A further object of the present invention is to provide a novel apparatus for the reduction of sewage sludge by incineration.

A still further object of the present invention is to provide a novel incinerator for burning sewage sludge.

Another object of the present invention is to provide a novel incinerator for burning sewage sludge which is simple in construction, is inexpensive to operate, and requires minimum maintenance.

Other objects and advantages of the present invention will become more apparent to those persons skilled in the art to which the present invention relates, from the following description taken in conjunction with the accompanying drawing wherein:

FIG. 1 is a vertical cross-sectional view of an embodiment of the invention; and FIG. 2 is a cross-sectional view taken along line 2—2 in FIG. 1.

Briefly described, the present invention relates to a sewage sludge incinerator comprising a chamber having a flue, baffle means mounted in the chamber, means for injecting air into the chamber impinging upon the baffle means, means for heating the air injected into the chamber to produce a zone of heated turbulent air, and means for injecting sewage sludge into the zone of heated turbulent air. Preferably, the baffle means is disposed between the means for injecting air into the chamber and the flue, and is provided with a concave surface upon which the injected air impinges, and the means for injecting the sewage sludge into the zone of heated turbulent air is mounted in the baffle means.

In the preferred embodiment of the invention the baffle means comprises a partition wall dividing the chamber into a combustion chamber section including the air injecting means and the air heating means, and a chamber section communicating with the flue, and the partition wall is provided with openings intercommunicating the chamber sections for conducting the products of combustion into the chamber section communicating with the flue.

Referring to the drawing, there is illustrated the preferred embodiment of the invention. The embodiment includes a vertical sidewall 10, a bottom wall 11, and a top wall 12 defining a chamber 13. The lower end of the chamber is provided with a cylindrical liner section 14, a bottom liner section 15 and a partition wall 16 mounted on the upper end of the cylindrical liner section 14 to divide the chamber 13 into a lower combustion chamber 17 and an upper chamber 18. The liner sections 14 and 15 and the partition wall 16 are formed of a fire resistant material.

The upper chamber 18 communicates through an axial passageway 19 and a breech 20 to a flue 21 which discharges the products of combustion emanating from the combustion chamber into the atmosphere. Sewage sludge to be incinerated is introduced into the lower combustion chamber 17 by means of a supply line 22 having an axially disposed section 23 extending through the vertical passageway 19, the upper chamber 18 and the partition wall 16, having the outlet thereof disposed below and adjacent the partition wall 16.

The partition wall 16 is provided with a substantially concave lower surface 24 and a plurality of circumferentially spaced openings 25 formed concentrically and adjacent the periphery thereof for conducting the products of combustion emanating from the lower combustion section 17 to the upper chamber 18. The upper wall of the chamber 18 is provided with a conical configuration to direct gases introduced through the openings 25, inwardly and upwardly into the axial passageway 19, wherefrom the gases pass through the breech 20 into the flue 21. As the gases pass through the upper chamber 18 and the axial passageway 19, they pass in heat exchange relation with the supply line section 23 to heat the sewage sludge introduced into the combustion chamber 17.

Air under pressure is introduced into the lower combustion section 17 by means of an air line 26 having an axially disposed section 27 extending through the lower wall 11 into the lower end of the lower combustion chamber. The section 27 is provided with a nozzle 28 which injects a stream of high velocity air upwardly into the lower combustion chamber 17, which impinges on the section of the concave surface 24 of the partition member 16, between the openings 25. The air impinging upon the partition wall 16 develops a zone of turbulent air in the vicinity where sewage sludge is introduced through the supply line 22 into the lower combustion section 17. The stream of high velocity air injected into the lower combustion chamber by the supply line section 17 is heated by a plurality of burners 29 mounted in the wall 10 and projecting into the lower combustion chamber 17.

In the operation of the embodiment illustrated in the drawing, a stream of high velocity air is injected into the lower combustion chamber 17 through the nozzle 28, and impinges on the partition wall 16. The stream of air is heated by the burners 29 to provide a zone of heated turbulent air in the vicinity of the outlet of the supply line 22. Sewage sludge introduced into the lower combustion chamber 17 through the supply line section 23 enters the zone of heated turbulent air and is incinerated. The solid particles resulting from the combustion of the sewage sludge fall to the bottom of the chamber 17 and eventually are discharged through a passageway 30 into a water trough 31. The gaseous products of combustion are discharged through the openings 25 in the partition wall, the upper chamber 18, axial passageway 19, and breech 20, into the flue 21. In flowing through the upper chamber 18, the gases pass in heat exchange relation with the supply line section 23, thus preheating the sewage sludge before it enters the zone of heated turbulent air in the lower combustion chamber. The dispersion of the sewage sludge in the zone of heated turbulent air in the lower combustion chamber facilitates a complete reduction of the sewage sludge to produce a residue of minimum volume and weight. The formation of the zone of heated turbulent air and the introduction of preheated sewage sludge into such zone with the exhaust and recovery of the products of combustion provide a sewage sludge reduction of maximum efficiency and economy.

I claim:

1. An apparatus for incinerating solids entrained in a fluid such as sewage sludge and the like comprising a chamber having a flue, baffle means mounted in said chamber, means for injecting a stream of high velocity air into said chamber so that the stream of air impinges substantially perpendicularly upon said baffle means, to produce a zone of turbulent air, means for heating said air injected into said chamber to produce a zone of heated turbulent air and means for injecting said solids entrained in a fluid into said zone of heated turbulent air.

2. An apparatus according to claim 1, wherein said baffle means is provided with a concave surface upon which said injected air impinges.

3. An apparatus according to claim 1, wherein said means for injecting said solids entrained in a fluid into said zone of heated turbulent air is mounted in said baffle means.

4. An apparatus according to claim 1, wherein said baffle means is disposed between said means for injecting air into said chamber and said flue.

5. An apparatus according to claim 1, wherein said means for injecting said solids entrained in a fluid into said chamber is disposed in heat transfer relation with heated gases discharged through said flue.

6. An apparatus according to claim 1, wherein said baffle means is disposed between said means for injecting air into said chamber and said flue, said baffle means is provided with a concave surface upon which said injected air impinges and said means for injecting said solids entrained in a fluid into said zone of heated turbulent air is mounted in said baffle means.

7. An apparatus according to claim 1, wherein said baffle means comprises a partition wall dividing said chamber into a combustion chamber section including said air injecting means and said air heating means, and a chamber communicating with said flue, and said partition wall having openings intercommunicating said chamber sections.

8. An apparatus according to claim 7, wherein said partition wall is horizontal.

9. An apparatus according to claim 7, wherein said openings in said partition wall are disposed adjacent and peripherally relative to said zone of heated turbulent air.

10. An apparatus according to claim 7, wherein said means for injecting said solids entrained in a fluid into said zone of heated turbulent air is mounted in said partition wall.

11. An apparatus according to claim 7, wherein said partition wall is provided with a concave surface upon which said heated air impinges.

12. An apparatus according to claim 7, wherein said means for injecting said solids entrained in a fluid into said zone of heated turbulent air is disposed in heat transfer relation with hot gases traversing through said chamber section communicating with said flue.

13. An apparatus according to claim 7, wherein said partition wall is horizontal and provided with a concave surface upon which said hot air impinges, said means for injecting said solids entrained in a fluid into said zone of hot turbulent air is mounted in said partition wall, having an outlet disposed in the center thereof, and said openings in said partition wall are disposed adjacent and peripherally relative to said zone of heated turbulent air about said solids inlet.

14. An apparatus according to claim 13, wherein said means for injecting said solids entrained in a fluid into said zone of heated turbulent air comprises a fluid line passing through said chamber section communicating with said flue in heat transfer relation with heated gases traversing said chamber section.

15. A method of incinerating solids entrained in a fluid such as sewage sludge and the like comprising injecting a stream of high velocity air into a chamber against a baffle member, so that said stream of high velocity air impinges substantially perpendicularly upon said baffle member, to produce a zone of heated turbulent air, heating said stream of air to produce a zone of heated turbulent air and injecting said solids entrained in a fluid to be incinerated into said zone of heated turbulent air.